US010482652B2

(12) United States Patent
de Roos et al.

(10) Patent No.: US 10,482,652 B2
(45) Date of Patent: Nov. 19, 2019

(54) IMAGE CONVERSION FOR SIGNAGE (71) Applicant: AIM Sport AG, Kriens-Lucerne (CH)

(72) Inventors: Bernardus de Roos, Kriens-Lucerne (CH); Daniel Bernard de Roos, Kriens-Lucerne (CH); Erik Jozef Benoit Hubo, Kriens-Lucerne (CH)

(73) Assignee: AIM SPORT AG, Kriens-Lucerne (CH)

( * ) Notice: Subject to any disclaimer, the term of this patent is extended or adjusted under 35 U.S.C. 154(b) by 578 days.

(21) Appl. No.: 14/892,581

(22) PCT Filed: May 13, 2014

(86) PCT No.: PCT/EP2014/059723
§ 371 (c)(1),
(2) Date: Nov. 20, 2015

(87) PCT Pub. No.: WO2014/187695
PCT Pub. Date: Nov. 27, 2014

(65) Prior Publication Data
US 2016/0217604 A1 Jul. 28, 2016

(30) Foreign Application Priority Data
May 23, 2013 (EP) ..................... 13168974

(51) Int. Cl.
*G06T 15/20* (2011.01)
*G06T 17/00* (2006.01)
*G06T 7/70* (2017.01)

(52) U.S. Cl.
CPC ............... *G06T 15/20* (2013.01); *G06T 7/70* (2017.01); *G06T 17/00* (2013.01); *G06T 2200/04* (2013.01)

(58) Field of Classification Search
CPC ......... G06T 11/00; G06T 15/08; G06T 15/10; G06T 15/20; G06T 17/00; G06T 19/00; G06T 2219/008
(Continued)

(56) References Cited

U.S. PATENT DOCUMENTS

| 5,933,544 A * | 8/1999 | Brown .................... G09F 19/12 345/419 |
| 6,389,236 B1 | 5/2002 | Western |

(Continued)

FOREIGN PATENT DOCUMENTS

| DE | 29823951 | 5/2000 |
| DE | 69801215 T2 | 5/2002 |

(Continued)

OTHER PUBLICATIONS

International Search Report PCT/EP2014/059723 dated Aug. 18, 2014.
(Continued)

*Primary Examiner* — Haixia Du
(74) *Attorney, Agent, or Firm* — Young & Thompson (57) ABSTRACT A method of image conversion for signage, displaying an image on a display surface, includes determining (1) a shape model of a three-dimensional object, determining (2) geometric properties of a display surface including a position and orientation of the display surface in a space, determining (3) a position of a viewpoint in the space, determining (4) a position and orientation of the shape model in the space, and computing (6) an inverse perspective projection onto the display surface based on the position of the viewpoint, for example the camera position in space, to generate a display image, wherein the display image, when displayed on the display surface and viewed through the viewpoint, appears to show the three-dimensional object with a position and
(Continued)

orientation according to the position and orientation of the shape model in the space.

15 Claims, 6 Drawing Sheets

(58) Field of Classification Search
USPC .......................................................... 345/427
See application file for complete search history.

(56) References Cited

U.S. PATENT DOCUMENTS

| | | |
|---|---|---|
| 7,155,849 B2 | 1/2007 | Hinterkeuser |
| 2001/0049300 A1* | 12/2001 | Okamoto ................ A63F 13/10 463/30 |
| 2003/0107580 A1* | 6/2003 | Egawa ................ G06F 17/3089 345/582 |
| 2005/0275915 A1 | 12/2005 | Vesely et al. |
| 2007/0200871 A1* | 8/2007 | Lee ........................ G06F 3/0213 345/619 |
| 2010/0079371 A1* | 4/2010 | Kawakami ............. G06F 3/012 345/156 |
| 2011/0113382 A1* | 5/2011 | Cannon .................. G06N 3/006 715/848 |
| 2012/0162204 A1* | 6/2012 | Vesely .................. G06F 3/0325 345/419 |
| 2012/0212755 A1* | 8/2012 | De Los Aires Alvarez ................ G06T 3/00 358/1.9 |
| 2013/0069937 A1* | 3/2013 | Kim ....................... G06F 3/0488 345/419 |
| 2015/0287349 A1* | 10/2015 | Michael .................. G09F 11/00 428/96 |

FOREIGN PATENT DOCUMENTS

| | | |
|---|---|---|
| DE | 10106658 | 3/2003 |
| DE | 69801215 T3 | 10/2006 |
| DE | 202012010931 | 1/2013 |
| EP | 0968495 | 1/2000 |
| WO | 9304559 | 3/1993 |
| WO | 9843231 | 10/1998 |

OTHER PUBLICATIONS

Miguel A. Nacenta et al.: "E-conic", Proceedings of the 20th Annual ACM Symposium on User Interface Software and Technology, UIST '07, 2007, p. 279, XP055093325, New York, New York, USA.

\* cited by examiner

Fig. 6

IMAGE CONVERSION FOR SIGNAGE

FIELD OF THE INVENTION

The invention relates to image conversion. More particularly, the invention relates to image conversion for signage. More particularly, the invention relates to image conversion for a digital signage system.

BACKGROUND OF THE INVENTION

Digital signage systems are often placed at public spaces, in particular locations with high visibility, such as airports, shopping malls, train stations or sport arenas. Recent developments in display technology have led to the introduction of digital displays that extend along the side of a sports field, to display advertisements or other announcements dynamically. The messages displayed on the digital displays are captured by the TV camera, so that a large audience is achieved for the messages, as well as being viewed by the viewers at the location.

WO 93/04559 discloses an image depicted in an inverse perspective form on a playing field for a sporting event.

WO 98/43231 discloses a figurative print for a plane print carrier that comprises a primary, a secondary, and a tertiary figurative element. Each of the three elements shows an angular displacement of between 0 and 90 degrees in relation to a perpendicular view of the figurative print on the plane print carrier so that the figurative print appears with a special effect, when the print is viewed from an oblique position relative to a perpendicular viewing.

DE 20 2012 010 931 U1 discloses a carpet with LEDs for displaying letters, characters, logos or film sequences that appear to stand upright, when viewed from a particular angle.

Since the prior art systems have limited possibilities, there is a need to eliminate those limitations. Moreover, there is a need for the creation of signage with new features.

SUMMARY OF THE INVENTION

It would be advantageous to provide an improved signage.

In a first aspect, the invention provides a method comprising:
determining a shape model of a three-dimensional object;
determining geometric properties of a display surface including a position and orientation of the display surface in a space;
determining a viewing position in the space;
determining a position and orientation of the shape model in the space;
computing an inverse perspective projection onto the display surface based on the viewing position to generate a display image, wherein the display image, when displayed on the display surface and viewed from the viewing position, appears to show the three-dimensional object with a position and orientation according to the position and orientation of the shape model in the space.

The method provides improved control of the appearance of three-dimensional objects shown by means of a signage display surface as seen from a particular viewpoint. For example, the method provides improved appearance of the three-dimensional object on a photo or video recording of the display surface captured by a camera. Complex three-dimensional objects may be visualized on the display surface and captured or viewed from a predetermined position.

The shape model may be positioned and oriented in the space at will and this orientation is correctly reflected in the image captured from the viewing position. This allows more freedom and ease in generating three-dimensional effects in digital images that are displayed on a physical display.

The display surface may comprise a paper or textile on which the display image may be printed, for example. Alternatively, the display surface may comprise the display surface of one or more display devices, such as a liquid crystal display (LCD), light emitting diode (LED) display, a cathode ray tube (CRT) display, or a projector. Alternatively, the display surface may be a virtual display surface in a virtual computer graphics scene, that may be integrated with or overlaid on a real world image, allowing to render a picture of the scene including the display surface showing the display image from the viewing position, using computer graphics computations.

The method may comprise computing a two-dimensional view of the three-dimensional object as seen from the viewing position. This allows a designer of an image or advertisement to obtain a preview of the image showing the object in the same way as it will be captured by the camera or viewed from the viewing position.

The step of computing the inverse perspective projection may comprise computing the inverse perspective projection of the two-dimensional view of the three-dimensional object as seen from the viewing direction. Accordingly, the two-dimensional view may be used as an intermediate image used in the process of generating the inverse perspective projection. This provides an efficient computation of the display image.

The steps of computing the two-dimensional view and computing the inverse perspective projection may be performed repeatedly, using different viewing directions for computing the two-dimensional view, to generate different display images covering different portions of the display surface. This provides a way to generate images for large physical display surfaces. For example, digital perimeter advertising surfaces can extend along the entire side of the playing field.

The method may comprise determining a shape model of physical objects that are present around the display surface, and wherein the two-dimensional view shows the three-dimensional object in the context of the physical objects, and displaying the two-dimensional view as a preview image. Herein, the two-dimensional view refers to the two-dimensional view of the three-dimensional object as seen from the viewing direction. This allows to enhance the preview with elements of the physical world in which the display surface exists. This allows a realistic preview of what will be visible through the camera.

The three-dimensional object may comprise a non-planar object. Non-planar objects, for example objects having real depth, can be displayed more realistically on video recordings using the techniques disclosed herein. For example, the three-dimensional object comprises a consumable. For example, a drinking glass, can, or bottle. Another example of an object is given by 3D logos and/or 3D text. Such logos and/or text can have an inherently three-dimensional design. Other kinds of objects can also be displayed.

The display surface may comprise a first portion having a first orientation and a second portion having a second orientation, wherein the first orientation is different from the second orientation. The method provides the flexibility to perform projections onto such complex display surfaces, while keeping control of the perceived orientation of the object by means of the shape model and the geometric properties of the display surface. The display surface may comprise more portions with different orientations. For example, the display surface may comprise a transition region to provide a gradual transition from one orientation to another orientation. For example, the geometric properties of the display surface comprise the local orientation of the display surface for different portions of the display surface.

Different copies of the shape model may be arranged along the display surface with an orientation that depends on the local orientation of the display surface. This can give an appealing effect, the object can be seen from different directions through the camera, as if the three-dimensional objects are aligned with the orientation of the display surface. This orientation of the display surface can be parallel to the edge of the playing field, for example.

The position and/or orientation of the shape model in the space may be selected such that the object appears to protrude out of the display surface and in a substantially horizontal direction. This allows to create an effect of an object that protrudes towards or over the playfield, or an object that protrudes at least partly towards the viewer of the captured image.

The method may comprise receiving an input representing an orientation and/or position of the three-dimensional object from a user interface. This allows a user to freely position the three-dimensional object in the space.

The surface of the display screen may be oriented substantially vertically. This makes that the display image is less distorted compared to a horizontally oriented display screen, when the display screen is viewed from a direction other than the viewing position, for example when viewed from a direction perpendicular to the surface of the display screen. This improves the appearance for the spectators in a stadium, for example.

The display surface may extend along the perimeter of a sports field or arena, or along at least one side or two sides of the sports field or arena. This improves the effect as the area on which the object can be displayed is greater.

The method may comprise receiving information whether the camera at the viewing position is active, and displaying the display image on the display surface if the camera at the viewing position is active. As the display image is optimized for being viewed from the camera position, if the camera at the viewing position is not active, it may be better to display something else on the display surface. For example, if another camera is active, a display image optimized for that other camera's position may be displayed. Alternatively, a plain image (not optimized for a particular camera position) may be displayed.

The method may comprise receiving information relating to a current field of view of the camera, and displaying a portion of the display image on a portion of the display surface corresponding to the current field of view of the camera. This way, the display image optimized for a particular camera position is only displayed insofar as it is useful for the image captured by the camera. The remaining portion of the display surface may be used to display something else, or may remain unused.

In another aspect, a method for displaying images on a display surface of a digital signage system is provided. The method comprises displaying a display image, generated by the method set forth hereinabove, on a display surface and capturing an image of the display surface displaying the display image using a camera at the viewing position that was used to generate the display image. This way, the display image, as seen in the captured image, appears to show the three-dimensional object with a position and orientation according to the position and orientation of the shape model in the space.

The methods disclosed above may be implemented as a computer program product comprising instructions for causing a processor to perform a method set forth herein. The computer program may be stored on a non-transitory computer readable media.

In another aspect, a system for digital perimeter signage is provided. The system comprises
a shape unit for determining a shape model of a three-dimensional object;
a display unit for determining geometric properties of a display surface including a position and orientation of the display surface in a space;
a viewing position unit for determining a viewing position in the space;
wherein the shape unit is configured to determine a position and orientation of the shape model in the space; and
a computing unit for computing an inverse perspective projection onto the display surface based on the viewing position to generate a display image, wherein the display image, when displayed on the display surface and viewed from the viewing position, appears to show the three-dimensional object with a position and orientation according to the position and orientation of the shape model in the space.

The person skilled in the art will understand that the features described above may be combined in any way deemed useful. Moreover, modifications and variations described in respect of the method may likewise be applied to the system and to the computer program product, and modifications and variations described in respect of the system may likewise be applied to the method and to the computer program product.

BRIEF DESCRIPTION OF THE DRAWINGS

In the following, aspects of the invention will be elucidated by means of examples, with reference to the drawings. The drawings are diagrammatic and may not be drawn to scale. Throughout the figures, similar items have been indicated with the same reference numerals.

FIG. 1 A is a flowchart of a method involving image conversion for digital signage.

DETAILED DESCRIPTION OF EMBODIMENTS

The figures, discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any suitable method or any suitably arranged system or device.

A signage system may be understood herein to comprise at least one display surface on which an announcement or picture can be displayed. A digital signage system may be understood herein as a system that comprises at least one digital signage player and one or more display surfaces that can be controlled by the signage player. The digital signage system may also comprise a plurality of signage players that cooperate to generate a synchronized behavior of a plurality of display surfaces. At least one digital signage player may comprise a storage media, on which content may be stored for display on said at least one display surface. Alternatively, the digital signage player may be configured to receive the content from an external device. The digital signage player may be configured to control the display surface via a communication channel between the digital signage player and the display surface. Digital signage may be understood as the process of displaying content on at least one display surface of a digital signage system.

Figure 1A:
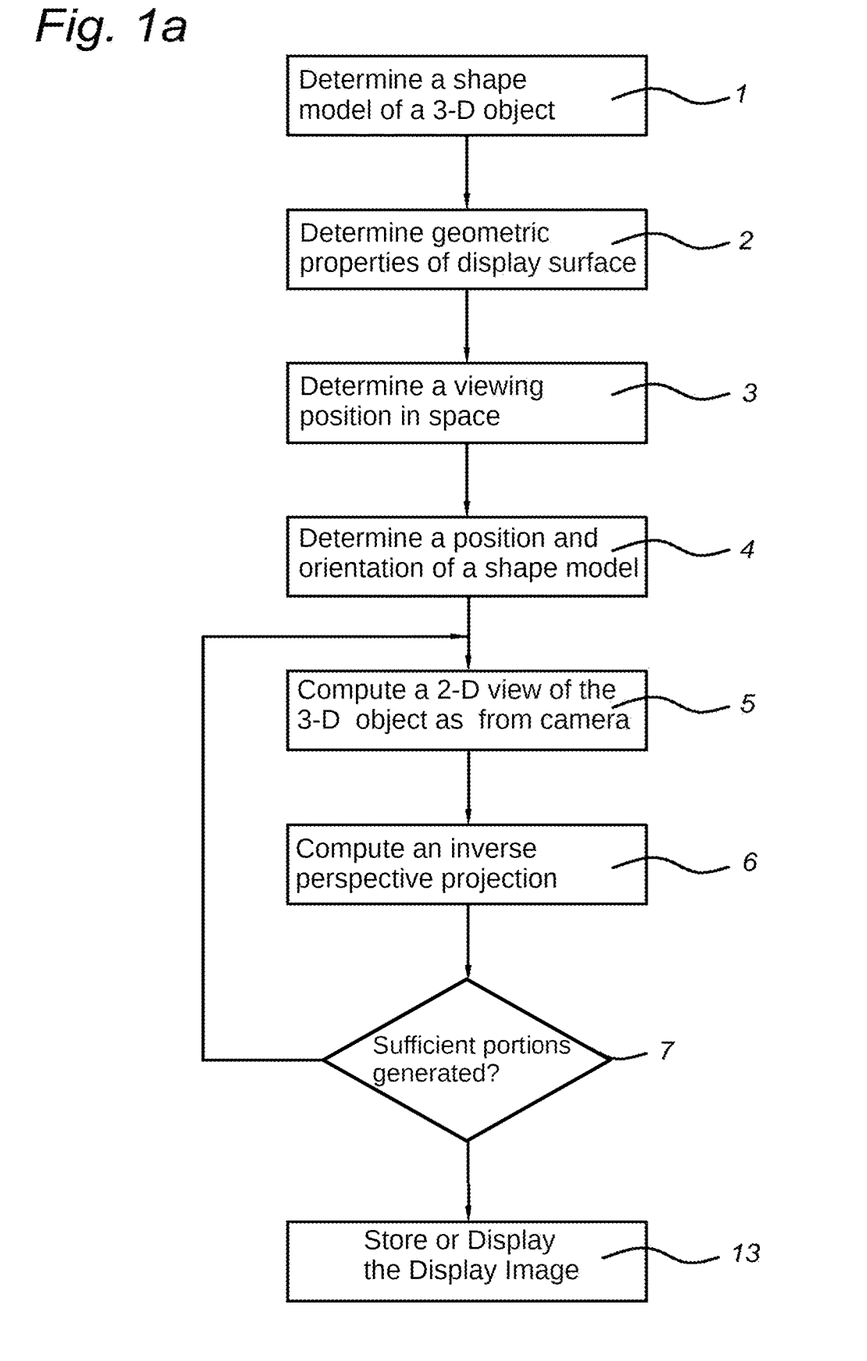

FIG. 1 illustrates a method of image conversion, for example for the purpose of providing digital signage. The method may proceed as follows. The steps may be performed in any suitable order. The method may be performed by a system, such as a processor system. Such a system may comprise a suitably programmed computer or processor system. Alternatively, the method may be performed by a digital signage player.

In step 1, the method determines a shape model of a three-dimensional object. For example, the shape model is received by the system using a means of communication. For example, the shape model may comprise a surface model, which may be a mesh model. Alternatively, the shape model may be a volume data set representing the shape by means of voxel data. The shape model may also comprise color information. For example, a surface mesh model may attach a color to different points on the mesh. A volume data set may attach a color to different voxels. Likewise, an opacity may be attached to each point. Other computer graphics attributes may be included in the shape model. The shape model may be represented in any way known, for example, in the field of computer graphics. For example, the shape model may model a physical object in the real world, such as a bottle or a hardware tool. The shape model may also represent characters or symbols that are shaped as three-dimensional objects. The shape model may also represent any virtual three-dimensional object. For example, the shape model may be created by a human creative designer using appropriate computer-aided design and/or computer-aided modeling (CAD/CAM) software.

In step 2, the method determines geometric properties of a display surface including a position and orientation of the display surface in a space. These geometric properties may comprise the dimensions of the display surface, such as height and width. Moreover, the geometric properties may include information indicative of the positions of individual pixels. For example, if the display is built up of LEDs, the information may be indicative of the positions of individual LEDs. However, this is not a limitation. These geometric properties may be received by the system, for example from a storage means or a user input.

In step 3, the method determines a viewing position in the space. This viewing position may be a camera position. This viewing position may correspond to the focal point of the camera, for example. Alternatively, the viewing position is well-defined with respect to the camera model, so that perspective projections can be computed according to the camera model, based on the viewing position. Although the camera is not needed when performing the image conversions, the camera may be present when the final converted image is displayed on the display surface, to capture the displayed image in the environment of the display surface. For example, the system may receive the position from a storage medium or from a user input or from a communication from a mixing desk at the respective production facility.

Although in the remainder of this description, the term "camera position" is often used, it will be understood that the term camera position can be interpreted more generally as a viewing position. For example, instead of a camera, a human observer could be present at the viewing position to enjoy the view of the display image on the display surface.

In step 4, a position and orientation of the shape model are determined in the space. This step could be combined with step 1. However, the steps may also be performed separately, for example, the shape model may be designed first, and then it may be arbitrarily positioned in the space. Moreover, a plurality of copies of the shape model may be put into the space, or the shape model may be reused for different purposes. The position and orientation may be determined, for example, based on input received from a user interface.

Optionally, the method may further determine, for example by means of a user input, properties of one or more virtual light sources, including a position of the light source with respect to the space. Such light sources may have further properties such as a direction and/or color of the light generated by the virtual light source. These light sources may be taken into account when generating views or projections of the object represented by the shape model.

In step 6, the method computes an inverse perspective projection. In this projection, the at least part of the object is projected onto the display surface based on the camera position. Specifically, the part of the object that is visible from the point of view of the camera position is projected onto the display surface. As the display surface can have any orientation, the projected image may be skewed or otherwise distorted when viewed from another angle than the point of view of the camera position. The result of the inverse perspective projection is referred to hereinafter as display image. The display image, when displayed on the display surface and viewed from the camera position, appears to show the three-dimensional object with a position and orientation according to the position and orientation of the shape model in the space.

It will be understood that in practice, the steps needed to generate the display image may be performed in advance, before an event takes place. During the recording of an event, a method may be performed that makes use of the display image.

It is noted that the inverse perspective projection may be performed in several different ways. First, as shown in FIG. 1A, the method may comprise step 5 of computing a two-dimensional view of the three-dimensional object as seen from the position of the camera. This two-dimensional view may be used as a preview image and/or as an intermediate result in the image conversion. Above-mentioned step 6, of computing the inverse perspective projection, may comprise computing the inverse perspective projection of the two-dimensional view. The two-dimensional view may comprise a projection of the object onto a plane 406 that is oriented perpendicular to the viewing direction of the camera. This may represent how the object should be shown on the captured image of the camera. Next, the two-dimensional view may be projected, using inverse perspective projection, onto the display surface using computer graphics computations and based on the camera position.

Step 5 of computing the two-dimensional view and step 6 of computing the inverse perspective projection may be performed repeatedly. In that case, in step 7 the flow may return to step 5. This way, two-dimensional views may be computed for different viewing directions in step 5. This means that the object is projected onto a differently oriented plane to account for a different portion of the space. Step 6 may then generate an inverse perspective projection that covers a different portion of the display surface in each step. These different portions may overlap each other. From e.g. digital photography, techniques are known to stitch such image portions together to obtain a continuous, large image. This stitching may result in a display image that covers as much of the display surface as desired. If it is decided in step 7 that sufficient portions have been generated, the method may proceed with step 13.

A second, alternative way to perform the inverse perspective projection may be provided as follows. Rays may be casted from the camera position onto the object (represented by the shape model). This may result in a color, using standard computer graphics techniques. The ray may then be extended to determine a point on the display surface. The color may then be associated with that point on the display surface. By performing this ray casting procedure for sufficiently distributed rays, the display image may be completed. This procedure may replace steps 5, 6, and 7.

In step 13, the display image may be stored for later use, or sent directly to a digital signage system for display.

Figure 1B:
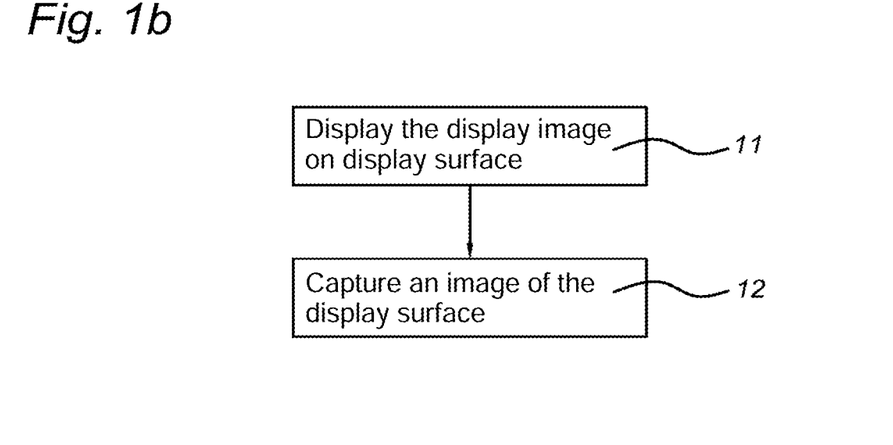
FIG. 1B is a flowchart of a method of capturing an image.

FIG. 1B illustrates a method of capturing an image. The method may comprise step 11 of displaying 11, by a digital signage player, a display image obtained by the method of claim 1 on a display surface. The method further may comprise step 12 of capturing an image of the display surface while displaying the display image. This image is captured using a camera that is positioned at the camera position that was used to generate the display image.

It is noted that the digital signage player is not essential. Alternatively, the display image may be reproduced, for example on paper or linen by printing or weaving techniques. This reproduction may form the display surface.

It is noted that the display surface may comprise a projection screen, wherein the display image is projected on the projection screen with a projector device. Alternatively, the display surface may comprise one or more display devices, such as CRT, LCD, or LED displays.

Figure 2:
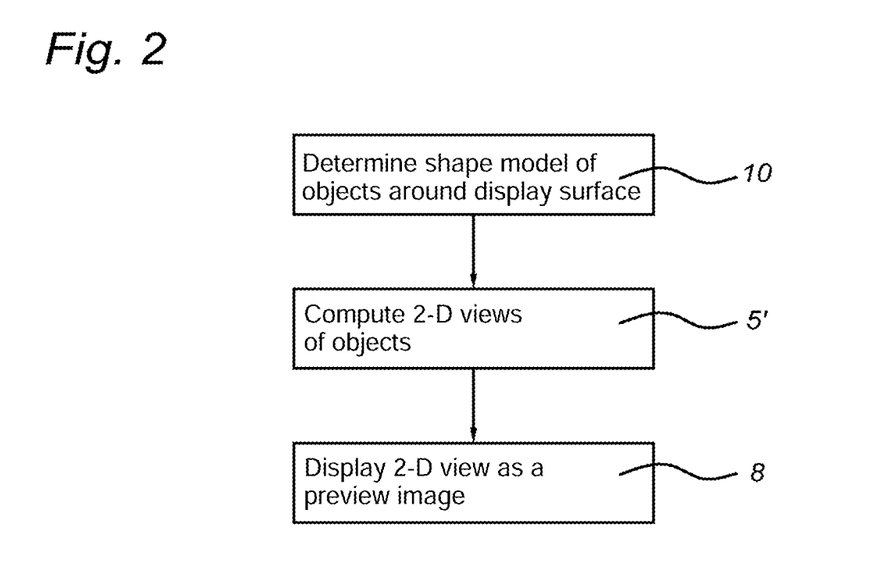
FIG. 2 is a flowchart of a method for creating a preview image.

FIG. 2 illustrates a method of generating an information-rich preview image. In step 10, the method determines a shape model of physical objects that are present around the display surface. For example, this shape model represents physical objects present in the real world in the space around the display surface. Examples of such physical objects are the playfield and painted lines on the playfield, the seats around the playfield. Possibly also players can be included. These shape models may be as detailed or sketchy as desired. In step 5', the method computes a two-dimensional view of the three-dimensional object and of the shape model of the physical objects around the display surface, as seen from the position of the camera. This two-dimensional view is computed such that the three-dimensional object is shown in the context of the physical objects. In step 8, the method displays the two-dimensional view as a preview image. This may help a user to properly design and/or position the three-dimensional object in the space.

Alternatively, the shape model of objects that are present around the display surface are not models of physical objects in the real world, but imaginary objects. Also, the display surface can be an imaginary object, and the camera can be an imaginary camera. The system may compute an image of these virtual objects, including the display surface showing the display image, as seen by the virtual camera. This can be computed by means of computer graphics techniques. The resulting image may be displayed on a display device or printed, or otherwise reproduced.

It is noted that generally the shape model can represent the shape of a non-planar object. In the present context this "non-planar" means that the object is not a flat, pancake-like object, such as characters with a relief, but rather has a real depth component. For example, the shape model can represent the shape of a consumable such as a bottle or a consumption. However, this is not a limitation. Indeed, characters, symbols, or logos with a relief can be modeled using the disclosed method.

Figure 3A:
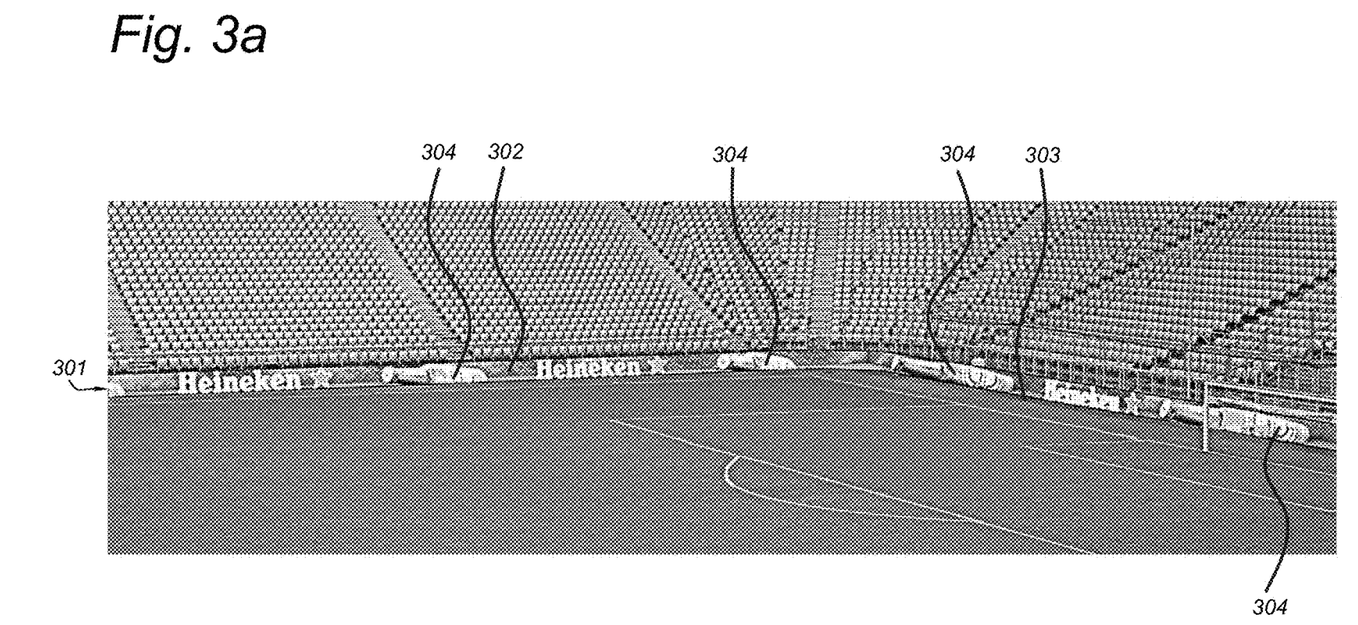
FIGS. 3A and 3B are sketches of snapshots of images captured with a camera.
Figure 3B:
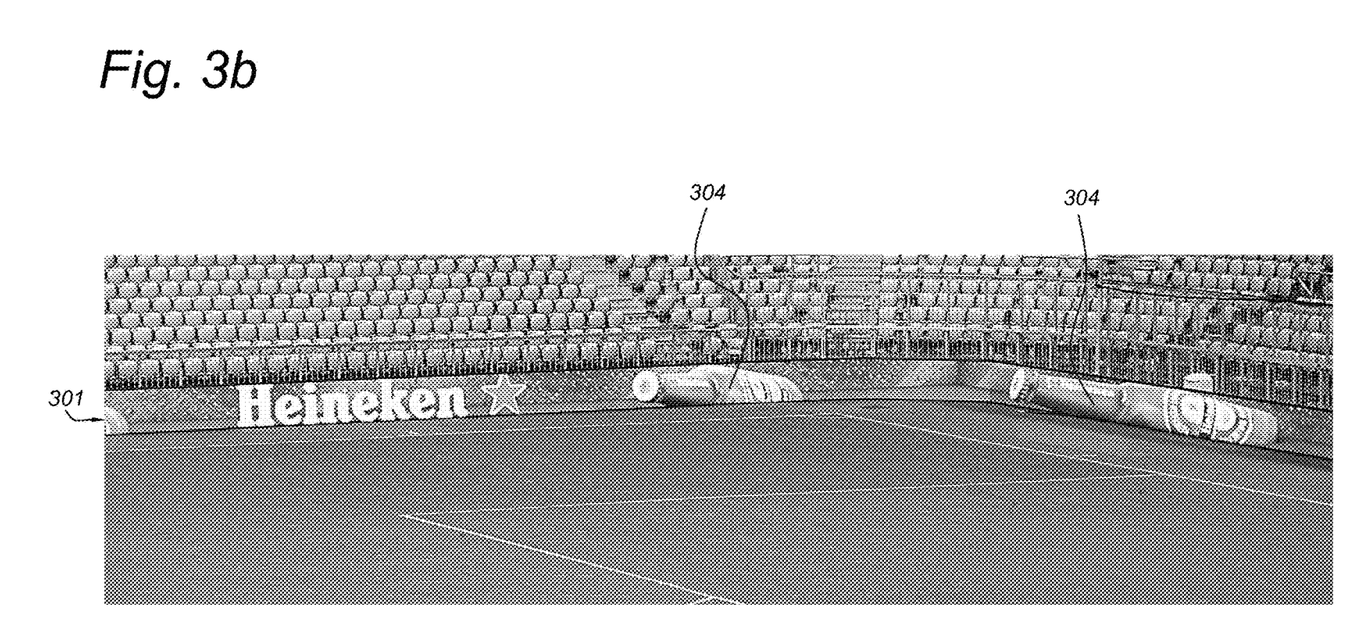
Figure 6:
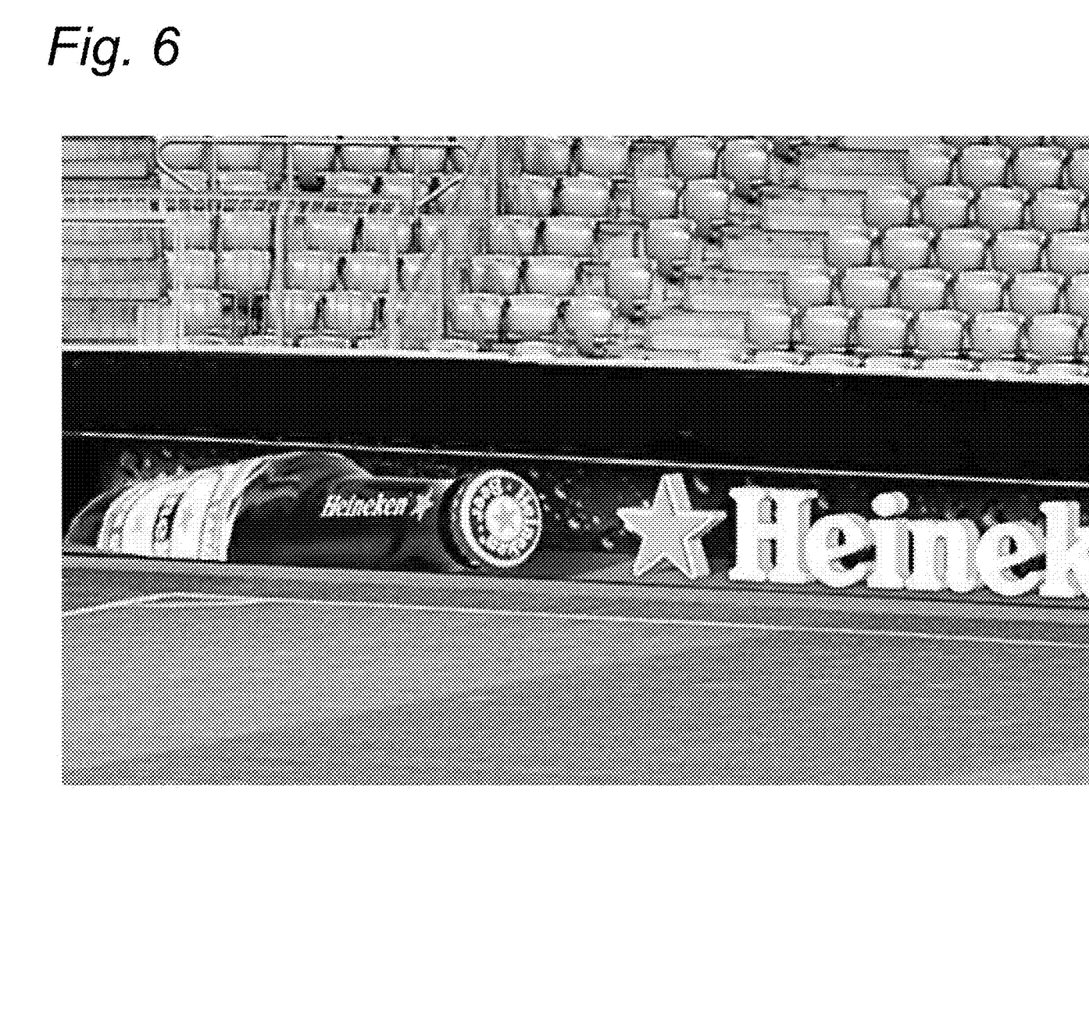
FIG. 6 is a sketch of a snapshot of an image captured with a camera.

In FIGS. 3A, 3B, and 6, the Heineken trademark has been used for illustration. Heineken is a trademark of Heineken Brouwerijen B.V.

FIGS. 3A and 3B show an impression of a live stadium visualization that could be captured with the present method. FIG. 6 shows a smaller portion of the stadium in greater detail. It is noted that the display surface 301 comprises a first portion 302 having a first orientation, and a second portion 303 having a second orientation, wherein the first orientation is different from the second orientation. In this particular example the two portions are orthogonal to each other. In between these two portions, there may be a smooth transition region with more different orientations, at the corner of the playing field. Moreover, it can be appreciated that a plurality of copies of the shape model 304 can be arranged along the display surface 302, 303. In this specific example, these copies of the shape model are arranged with an orientation that depends on the local orientation of the display surface 302, 303. However, this is not a limitation. It can be appreciated that the present method generates an enhanced three-dimensional effect.

Step 4 of determining a position and orientation of the shape model can comprise receiving an input representing an orientation and/or position of the three-dimensional object from a user interface. Such a user interface can be part of a computer workstation or laptop, for example. The method may provide the computer workstation or laptop with user interface elements allowing to add, move, rotate, and/or resize a three-dimensional object in the three-dimensional space. An interactive modeling environment may be provided, in which also the playfield and the display surfaces are represented, so that a designer can easily position the object with a view to the end result. Moreover, the user and/or software can take into account the position of the display surfaces, as only a part of the object that is in a line of sight between the camera position and the display surface, would be visible by the camera.

In FIGS. 3A and 3B, the display surface 301 is oriented in upright position. The display surface is oriented substantially vertically. The display surface 302 extends along the perimeter of a sports field or arena. This display surface 302 can also extend along only a portion of the perimeter of the sports field or arena. Any number of separate display surfaces can be provided. For each display surface, a display image can be prepared using the techniques described herein.

Figure 4:
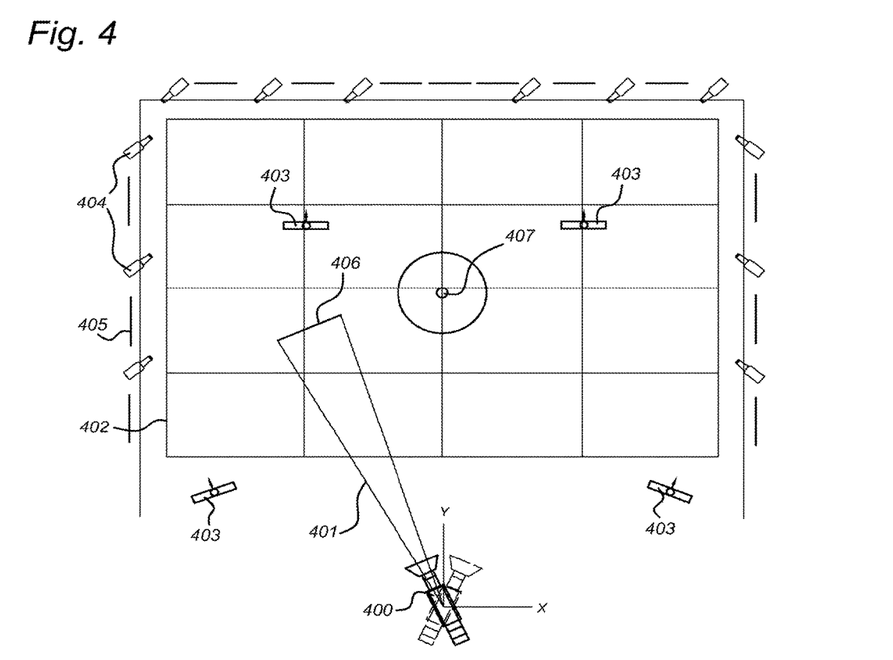
FIG. 4 is a sketch of a snapshot of a modeling program.

FIG. 4 shows a simplified top view of a sports field 402. Several virtual objects 404 and logos 405 (modeled internally as 3D shape models) are illustrated in the figure. Moreover, several virtual light sources are shown. Light source 407 is a non-directional virtual light source, and light sources 403 are directional virtual light sources. The direction of the light of each directional virtual light source 403 is indicated roughly by the arrow protruding from the light source 403. The figure also shows an indication of the viewing position 400 by means of a camera. The coordinate system X,Y may be regarded as an example of a coordinate system to define positions in the space.

During a live broadcast, a device may receive information whether the camera 400 at the camera position is active, i.e., whether that camera's captured images are being broadcast. Optionally, the display surface may be configured to display an image in dependence on that information. For example, the display surface may display something else, for example a simple two-dimensional logo, when the camera 400 is not active (but another camera at another position may be active). The display surface may be configured to display the display image on the display surface if the camera at the camera position is active. If the camera 400 is active, the display surface may be configured to display the display image during particular time intervals, for example. It is also possible that a plurality of display images for a particular camera position are combined in a video sequence or animation.

This device may be configured to translate the active camera position information to a general purpose input signal. Three possible working scenarios for playback are:

1) fully automatic: the device directly activates a corresponding display image for the new camera when selected. This ensures an optimal viewing experience from all viewing points. For example, display images are available for a plurality of different viewing positions. In this case, the display surface may be configured to display a display image prepared for the position of the currently active camera. The system may also be configured to dynamically compute a display image based on a current viewing position of an active camera. This is an example that provides support for a free positioning of the camera and/or a freely moving camera, for example.

2) semi-automatic: the device generates a notification, for example to an operator, that the used camera position has changed. The operator can allow or reject this change. To this end, the device may comprise control means to receive a corresponding command from a user interface. This is useful when some camera positions are not supported.

3) manual: the system does not receive information regarding the camera position, but the operator may know which camera is active at which moment. The operator can manually select the display image corresponding to the current camera position. The device may be configured to display the selected display image on the display surface in response to the manual selection.

The digital signage player may be configured to keep track of the amount of time a display image optimized for a particular viewing direction is displayed, and ensure that the total amount of time the display image is displayed at a time that the camera at the viewing position is active corresponds to a predetermined setting.

Figure 5:
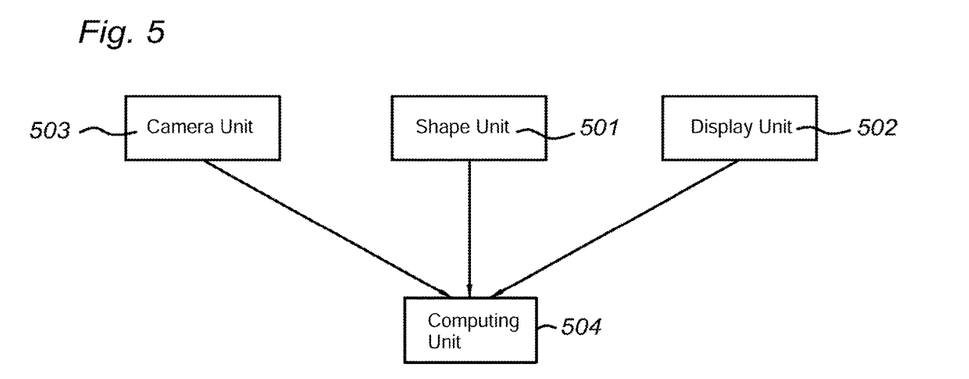
FIG. 5 is a diagram of a system for generating contents for digital signage.

FIG. 5 shows a block diagram of elements of a system that can be used to prepare digital perimeter signage. The system may comprise a shape unit 501 for determining a shape model of a three-dimensional object. The shape unit 501 may be configured to determine a position and orientation of the shape model in the space.

The system may comprise a display unit 502 that is configured to determine geometric properties of a display surface of a display device. These geometric properties may include, but are not limited to, a position and orientation of the display surface in a space. The geometric properties may comprise detailed information relating to positions of individual pixels of the display device in the space. This detailed information may be used by the computing unit to achieve great accuracy in the display image. However, this is not a limitation.

The system may comprise a camera unit 503 configured to determine a position of a camera in the space. The camera unit 503 may receive a user input representing the camera position. Alternatively, the camera unit 503 may receive a signal from an external device, such as the camera itself or a tracking system that keeps track of the position of the camera.

a computing unit 504 for computing an inverse perspective projection onto the display surface based on the camera position to generate a display image. For example, the display image, when displayed on the display surface and viewed from the camera position, appears to show the three-dimensional object with a position and orientation according to the position and orientation of the shape model in the space. This may be achieved by performing computations in order to compute an inverse projection of a view of the three-dimensional object, as computed from the shape model, onto the display surface.

The system may be implemented at least partly as a computer program that causes a processor system to perform the prescribed functionality. The system may be extended or modified with software units performing functionality described hereinabove in respect of the method.

The system may comprise hardware components, such as a workstation to enable a graphic designer to make a design with the virtual three-dimensional object in a space that has the physical objects of the stadium in it. These physical objects may also be modeled in the software, to obtain a representation of the real world in the workstation, to enable a designer to preview the design. The display device, including in particular its display surface, and the camera, in particular the position of the camera, may also be included in the model, as inputs to the computing unit 504 that is responsible for generating the display image that is displayed on the display surface by the display device.

A method may be provided that receives a 3D model of the object that is desired to be displayed. The 3D model may be freely positioned with respect to a physical environment (such as a sports field). The 3D model, or shape model, may represent a real physical object, or it may be an imaginary object. If it is a real physical object, this does not mean that the physical object is actually present in the space. Rather, it is to be displayed on the display surface.

A 3D model may be created of the physical environment and camera position. Moreover, a 3D model may be created of the surface formed by one or more display devices, on which the 3D model can be displayed.

Subsequently, an image may be prepared for display on the display surface, based on the 3D models. This image is referred to herein as the 'display image'. This step may be performed using a projection transformation, in particular an inverse perspective projection transformation. The display image may then be displayed on the display surface of the one or more display devices. While this display image is displayed on the display surface, the scene formed by the physical objects in the space, the display image displayed on the display surface, and possible further physical objects (e.g. humans such as sportsmen and a ball and details of the stadium) that were not necessarily modeled, may be captured with a still image or moving picture camera, from the camera position. The captured still image or moving picture may be broadcasted, for example by means of a live broadcast.

A system may be provided for providing a 3D effect in a photo or a captured video sequence. The system may comprise a shape model creator for creating a three-dimensional shape model of a (virtual) object, a real environment, a real display surface, and a real camera. The system may comprise a computing unit for transforming the (virtual) 3D object into a two-dimensional image based on the 3D models. The system may further comprise a display unit to display the image on the display surface, and a camera to capture the picture including the display surface and an event happening in the space, such as a soccer game.

Only the portion of the display surface that is visible in the camera field of view needs to display the image, the remaining portion of the board can be black or used for different purposes.

A WYSIWYG computer program, may be used to visualize the end result using a virtual camera instead of the real physical camera.

The methods and systems described herein allow to create a virtually arbitrary 3D perception using active output screens. It allows to create the impression of an arbitrary 3D scene recorded by an arbitrary camera, using real world output screens to display the 3D scene. The content on the real world screens may be distorted in such a way that the recorded image from the camera perceive the 3D illusion. To reach this goal, or another goal, a procedure is disclosed herein that can cancel the 3D to 2D projection introduced by the camera.

A detailed description can be made of the active areas on the output screens. Each corner point on the output screen may be represented with a homogeneous coordinate tuple (X,Y,Z,W), e.g. a vertex. Such coordinate tuples are known in the field of computer graphics, for example OpenGL. Together with the vertices, a vertex connection list may be saved along with the normal direction and the horizontal and vertical DPI of the output screen. All these parameters together may be used to describe a model in 3 dimensions representing the active areas of the output screens. The 3D modeling technique allows to position the output screens arbitrarily in the real world. The output screens are therefore not restricted to purely horizontal/vertical placements. Furthermore, the output screens may be freely positioned in any orientation, height and plane position.

Next to the virtual model of the real world screens, the camera may be modeled with a mathematical model using intrinsic and extrinsic parameters. The camera position (X,Y,Z,W) may be measured from previous recordings from that camera or recorded with a laser measurement tool. Other means to determine the camera position are also possible. A camera calibration may be performed to determine the camera calibration matrix K. From this camera calibration matrix, the principal point offset in X and Y dimension, together with the skew and vertical and horizontal focal length, can be determined.

Moreover, the camera rotation (or orientation) may be determined This rotation may be expressed in pan, tilt and roll. Camera pan, tilt, roll, and zoom can be read out from a instrumented tripod or determined using various computer vision techniques, as described in "Multiple View Geometry in Computer Vision" by Richard Hartley and Andrew Zisserman, 2004. From this information, a camera projection matrix P may be computed. Details are given in the book by Richard Hartley and Andrew Zisserman. The camera projection matrix P may be a 3×4 matrix. The components of the matrix P may be derived using for example the theory described in Zisserman. This matrix P is referred to as projection matrix from 3D to 2D. Each point in the 3D world may be multiplied by this projection matrix resulting in a 2D representation of the 3D scene as viewed from this camera.

Next to the Projection matrix, it is possible to model the camera lens distortion parameters. These parameters may also be extracted during the camera calibration phase using a checkerboard pattern. The used lens distortion model can be freely chosen according to the selected lens type. The projected 3D points are then transformed according to the chosen lens distortion model. Alternatively, the camera can perform camera distortion correction by itself. Taking the camera calibration parameters into account is optional.

The content can be made in standard or dedicated 3D modeling software. The content can have an arbitrary shape (from plane to complex 3D models, like a car). The content can be modeled keeping in mind any hard boundaries of the real world output screens. Therefore, it may be useful to import the 3D model of the real world output screens into the modeling software to know the exact boundaries of the screens in the real world.

It is possible to use a Pan Tilt Roll Zoom camera, which has a fixed position, so that all images are shot from the same position. However, this is not a limitation. In that case, there may exist an interframe homography between display surface points as shown on different images captured by the camera. It may be possible to generate a unified panorama, that can support all different pan, tilt, roll, and zoom configurations of the camera. Using this result, it is possible to render a finite number of partly overlapping views of the virtual 3D scene of the content, covering all real world output screens (i.e., all of the display surface), resulting in a 'unified panorama'. To make sure all output screens are covered with a high degree of precision, a high focal length can be chosen. In many cases, only pan and tilt need to be adjusted. Next to the generated images of the 3D scene, the used camera parameters are saved for further processing. These rendered images represent exactly the images we want to see on the real output screens if we look though the real camera.

The specially rendered images may be loaded into a digital signage player. This player may also have knowledge of the 3D model of the output screens generated before. The player may be able to address each pixel of the output screens individually. Each pixel position (X,Y,W) of the display surface may be multiplied with the currently active camera's inverse projection matrix of the 3D to 2D projection resulting in a 3D coordinate (X,Y,Z,W), called the inverse projected position. The color information on the inverse reprojected positions may be sampled from the unified panorama. The reprojected pixels may be gathered into locally adjacent groups and sent to the display device or display devices. The display device(s) then display the inverse camera projected virtual 3D scene. If the active camera captures this image, it inherently multiplies the inverse camera projected image with its own camera matrix, resulting in $P(P^{-1} (P(3Dcontent)))=P(3Dcontent)$, wherein $P^{-1}$ denotes an inverse (or a pseudo-inverse) of projection matrix P, and 3Dcontent denotes the shape model of the three-dimensional object. This means that the fact that the display surface is not perpendicular to the viewing direction of the camera does not lead to distortions of the end result, the image captured by the camera.

To know which camera is active during broadcasting, the red light protocol may be used. This protocol is known in the technical art of live broadcasting equipment. Optionally, the data generated with this protocol may be converted into the GPI or into the MIDI protocol, or any other suitable format, in real-time. If necessary after conversion, the red light protocol control signals sent from the mixing desk can be read in into the digital signage player. The protocol can generate a trigger that selects the used camera and selects the respective parameters and transforms the display image according to the selected camera.

The techniques described herein can also be used for moving 3D scenes. For example, it is possible to generate a uniformed panorama for each frame in an animation.

It is possible to provide content designers with a design system that provides WYSIWYG ('what you see is what you get') functionality. Since the real world is completely rebuilt in 3D and the all the needed camera parameters are known, the designer can look through a 'virtual camera' to the virtual representation of the real world and place new virtual 3D objects on the exact location the designer wants. The designer may get direct feedback of what the result will look like, once it is recorded by the camera. This is very valuable since it gives the designer more certainty over the produced quality and no expensive on-field trial and error is needed. The preview image may be generated without applying the inverse camera reprojection at this stage.

Some or all aspects of the invention may be suitable for being implemented in form of software, in particular a computer program product. Such computer program product may comprise a storage media on which the software is stored. Such a storage media may comprise, for example, an optical disc, magnetic disk, or flash memory. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be directly executable by one or more processors. Alternatively, the code may be interpreted by an interpreter that is executed by one or more processors. It will be understood that portions of the systems described herein may be implemented in form of software. Moreover, the method steps described herein may be implemented partially or completely in software. The software may be organized by means of subroutines. The subroutines may be combined to form a standalone executable program. Alternatively, the subroutines may be organized as a dynamically linkable library. A main program executable file may be provided that uses the subroutines from the dynamically linkable library. Each of the processing steps and/or system components described herein may be represented by executable code, be it in a dynamically linked library or in an executable file. Some, or all, of the functionality may be implemented as part of an operating system, some functionality may be implemented in a dynamically linked library, and some functionality may be implemented as an application program file.

The examples and embodiments described herein serve to illustrate rather than limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

The invention claimed is:

1. A method of image conversion for signage, comprising:
   determining a shape model of a three-dimensional object;
   determining geometric properties of a display surface of a display device, including a position and orientation of the display surface in a space;
   determining a viewing position in the space;
   determining a position and orientation of the shape model in the space;
   determining a shape model of physical objects that are present around the display surface;
   computing a two-dimensional view of the three-dimensional object and of the shape model of the physical objects around the display surface, as seen from the viewing position, wherein the two-dimensional view shows the three-dimensional object in the context of the physical objects;
   displaying the two-dimensional view as a preview image of an image that is visible through a camera at the viewing position;
   computing an inverse perspective projection of at least a part of the object that is visible from the viewing position onto the display surface based on the viewing position to generate a display image, where the display image, when displayed on the display surface and viewed from the viewing position, appears to show the three-dimensional object with a position and orientation according to the position and orientation of the shape model in the space;
   displaying the display image on the display surface; and
   capturing an image of the display surface displaying the display image, using the camera at the viewing position.

2. The method of claim 1, wherein the step of computing the inverse perspective projection comprises computing the inverse perspective projection of the two-dimensional view.

3. The method of claim 2, wherein the steps of computing the two-dimensional view and computing the inverse perspective projection are performed repeatedly, using different viewing directions for computing the two-dimensional view, to generate different display images covering different portions of the display surface.

4. The method of claim 1, wherein the three-dimensional object comprises a non-planar object.

5. The method of claim 4, wherein the three-dimensional object comprises a consumable or a 3D logo.

6. The method of claim 1, wherein the three-dimensional object comprises a consumable or a 3D logo.

7. The method of claim 1, wherein the display surface comprises a first portion having at least a first orientation and a second portion having a second orientation, wherein the first orientation is different from the second orientation.

8. The method of claim 7,
   wherein different copies of the shape model are arranged along the first portion having the first orientation and the second portion having the second orientation, and
   wherein each orientation of the different copies of the shape model depends on a corresponding local orientation of the first portion and the second portion.

9. The method of claim 8, wherein the position and/or orientation of the shape model in the space is such that the object appears to protrude out of the display surface and in a substantially horizontal direction.

10. The method of claim 1, wherein the step of determining a position and orientation of the shape model comprises receiving an input representing an orientation and/or position of the three-dimensional object from a user interface.

11. The method of claim 1, wherein the display surface is oriented substantially vertically.

12. The method of claim 1, wherein the display surface extends along the perimeter of a sports field or arena.

13. The method of claim 1, further comprising:
receiving information whether the camera at the viewing position is active; and
wherein the display image is displayed on the display surface on condition that the camera at the viewing position is active.

14. A system for image conversion for signage, comprising:
a display device comprising a display surface;
a camera;
a shape unit that determines a shape model of a three-dimensional object;
a display unit that determines geometric properties of the display surface of the display device including a position and orientation of the display surface in a space;
a viewing position unit that determines a viewing position of the camera in the space, and the shape unit being configured to determine a position and orientation of the shape model in the space;
a computing unit that determines a shape model of physical objects that are present around the display surface and computes a two-dimensional view of the three-dimensional object and of the shape model of the physical objects around the display surface, as seen from the viewing position, wherein the two-dimensional view shows the three-dimensional object in the context of the physical objects; and
a display that displays the two-dimensional image as a preview image of an image that is visible through the camera,
wherein the computing unit also computes an inverse perspective projection of at least a part of the object that is visible from the viewing position onto the display surface based on the viewing position to generate a display image, where the display image, when displayed on the display surface and viewed from the viewing position, appears to show the three-dimensional object with a position and orientation according to the position and orientation of the shape model in the space,
wherein the display device is configured to display the display image on the display surface, and
wherein the camera is configured to capture an image of the display surface displaying the display image.

15. A computer program product stored on a non-transitory computer readable media, comprising instructions for causing a processor to perform the method of claim 1.

* * * * *